US009123064B2

(12) United States Patent
Hogg et al.

(10) Patent No.: US 9,123,064 B2
(45) Date of Patent: Sep. 1, 2015

(54) ONLINE TRANSACTIONS USING AN EMBEDDED STOREFRONT WIDGET

(75) Inventors: Jason J. Hogg, St. Petersburg, FL (US);
Cory Moreira, New York, NY (US);
Andrew Peret, Riverview, FL (US);
Kiran Jagannath, Bangalore (IN)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 645 days.

(21) Appl. No.: 13/408,092

(22) Filed: Feb. 29, 2012

(65) Prior Publication Data
US 2013/0226736 A1 Aug. 29, 2013

(51) Int. Cl.
*G06Q 30/06* (2012.01)
*G06F 17/30* (2006.01)
*G06Q 30/08* (2012.01)
*G06Q 50/00* (2012.01)

(52) U.S. Cl.
CPC .............. *G06Q 30/06* (2013.01); *G06F 17/30* (2013.01); *G06Q 30/08* (2013.01); *G06Q 50/01* (2013.01)

(58) Field of Classification Search
None
See application file for complete search history.

(56) References Cited

U.S. PATENT DOCUMENTS

| 5,710,887 | A | 1/1998 | Chelliah et al. | |
| 7,024,373 | B1 | 4/2006 | Reynolds et al. | |
| 7,895,080 | B2 | 2/2011 | Haynes et al. | |
| 2008/0255962 | A1* | 10/2008 | Chang et al. | 705/27 |
| 2009/0164315 | A1* | 6/2009 | Rothman | 705/14 |
| 2010/0114739 | A1* | 5/2010 | Johnston | 705/27 |
| 2012/0303489 | A1* | 11/2012 | Robb et al. | 705/27.1 |
| 2012/0323732 | A1* | 12/2012 | Rothman et al. | 705/26.41 |

OTHER PUBLICATIONS

Anonymous, "Widgetbox Delivers Holiday Gift: Makes First Web Widget Analytics Availabel; Syndication Metrics Now Available for Any Registered Widget at Widgetbox", Dec. 21, 2006, PR Newswire.*

* cited by examiner

*Primary Examiner* — Courtney Stopp
*Assistant Examiner* — Brittany Bargeon
(74) *Attorney, Agent, or Firm* — Snell & Wilmer L.L.P.

(57) ABSTRACT

A method and system of using widgets embedded in web pages as virtual storefronts is disclosed. A user of a social networking site may create a merchant account with a transaction service provider. The user embeds a storefront widget provided by the transaction service provider in the user's profile page on the social networking site and the user can use the storefront widget to input information about products that the user is selling. Other users of the social networking site view the user's profile page and the storefront widget will display the products that the user is selling. The other users may interact with the storefront widget to purchase the products that the user is selling.

18 Claims, 7 Drawing Sheets

ONLINE TRANSACTIONS USING AN EMBEDDED STOREFRONT WIDGET

BACKGROUND

Social networking sites have become an important means for people to interact with one another. Each user of a social networking site often creates a profile page on the social networking site. A user may typically configure his or her profile page to express the user's interests, educational information, employment information, and/or other personal information. In addition, a user may usually configure his or her profile page to include photographs, video clips, drawings, sound recordings, and other types of media.

After a user of a social networking site creates his or her profile page, the user may typically create a friends list that contains references to other users of the social networking site. People on a user's friend list may often view at least some of the user's profile page. In addition, the user may usually view profile pages of users on the user's friend list.

More recently, certain social networking sites have enabled users to embed small applications, known as widgets, into their profile pages. For example, a user can embed a widget that automatically compares favorite movies with friends' favorite movies. These widgets may usually be implemented in several ways. For instance, widgets may be implemented as ActiveX objects, Java Applets, Abode Flash™ objects, or otherwise. When a widget is embedded in a user's profile page, the widget may typically appear on the profile page. Continuing the example regarding the widget that compares favorite movies, the widget may list the number of favorite movies that the user shares with each of his or her friends.

SUMMARY

In general, this disclosure describes techniques of using widgets embedded in web pages as virtual storefronts. As described herein, a user of a social networking site may create a merchant account with a transaction service provider. In response to the user embedding a storefront widget provided by the transaction service provider in the user's profile page on the social networking site, the user can use the storefront widget to input information about products that the user is selling. Subsequently, in response to other users of the social networking site viewing the user's profile page, the storefront widget displays the products that the user is selling. The other users may then interact with the storefront widget to purchase the products that the user is selling.

The techniques of this disclosure may be conceptualized and implemented in several ways. In various embodiments, the techniques of this disclosure may be conceptualized as a method that comprises storing product information associated with the merchant account, wherein the product information describes a product. The method also comprises receiving a request for an instance (e.g. a copy) of a storefront widget from a client device that is processing a first web page in which the storefront widget is embedded, the first web page belonging to a first website. In addition, the method comprises sending the product information to the client device. The method may also include sending a copy of the storefront widget to the client device, the storefront widget being configured to present the product information and to present a link that identifies a resource of a second website. In various embodiments, the resource is accessed and initiates a process that embeds the storefront widget in a second web page that is included in the second website.

In various embodiments, the techniques of this disclosure may be conceptualized as a server system that comprises an account database that stores data representing a merchant account and a purchaser account. The server system also comprises a product information database that stores product information associated with the merchant account, the product information describing a product. Furthermore, the server system comprises a widget server module that receives a request for a copy of the storefront widget from a client device that is processing a web page in which the storefront widget is embedded and that sends the copy of the storefront widget to the client device. In addition, the server system comprises a product information module that sends the product information to the client device, wherein the copy of the storefront widget on the client device is configured to present the product information. The server system also comprises a transaction module that receives a purchase request from the copy of the storefront widget on the client device and, in response to the purchase request, electronically transfers money to the merchant account from the purchaser account.

In various embodiments, a computer-readable storage medium comprises instructions that, when executed at a computer system, cause the computer system to maintain an account database that stores data representing a merchant account and a purchaser account. The instructions also cause the computer system to store product information associated with the merchant account, the product information describing a product. Furthermore, the instructions cause the computer system to receive a request for a copy of a storefront widget from a client device that is processing a web page in which the storefront widget is embedded. The instructions also cause the computer system to send the product information to the client device. In addition, the instructions cause the computer system to send a copy of the storefront widget to the client device, the storefront widget configured to present the product information. In various embodiments, the instructions cause the computer system to receive a purchase request for the product from the copy of the storefront widget on the client device. The instructions also cause the computer system to electronically transfer money from the purchaser account to the merchant account in response to the purchase request.

The techniques of this disclosure may, in various embodiments, be conceptualized as a method that comprises sending, to a client device, product information that describes a product. The method may include sending, to the client device, a storefront widget that comprises instructions that, when performed by the client device, cause the client device to: display the product information in a first web page in which the storefront widget is embedded, the first web page belonging to a first website; and present an administrative interface that includes a feature that enables a user of the client device to embed the storefront widget in a second web page of a second website.

This summary is not intended to identify key features or essential features of the claimed subject matter, nor is it intended to be used to limit the scope of the claimed subject matter.

DETAILED DESCRIPTION

Figure 1:
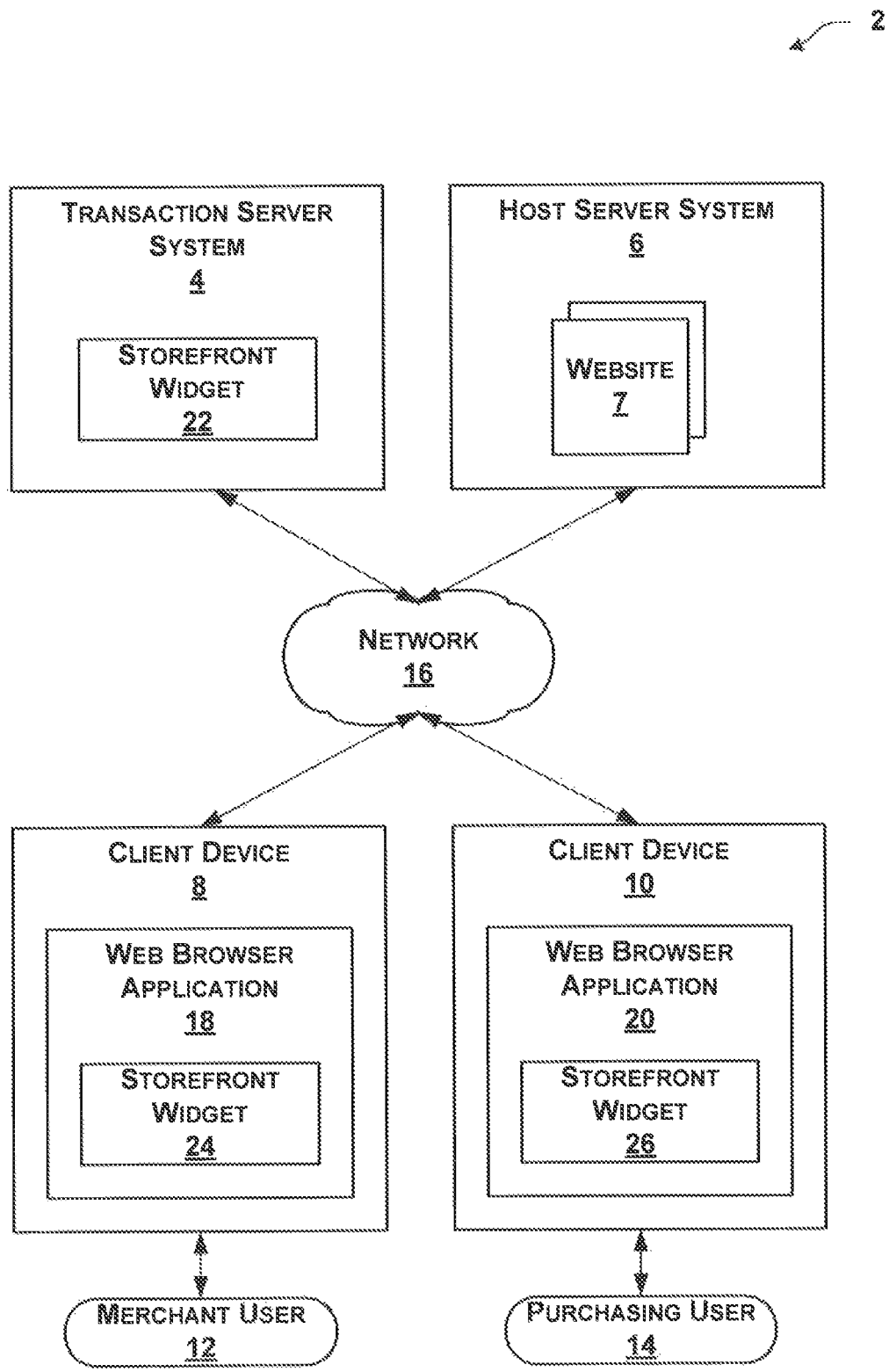
FIG. 1 is a block diagram illustrating an example system, in accordance with various embodiments.

The detailed description of exemplary embodiments herein makes reference to the accompanying drawings and pictures, which show the exemplary embodiment by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers.

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers, A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of the various systems of this disclosure may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the MST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

Phrases and terms similar to an "item" may include any good, service, information, experience, data, content, access, rental, lease, contribution, account, credit, debit, benefit, right, reward, points, coupons, credits, monetary equivalent, anything of value, something of minimal or no value, monetary value, non-monetary value and/or the like.

Phrases and terms similar to an "entity" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account. The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alphanumeric characters that identify a particular merchant for purposes of account acceptance, account reconciliation, reporting, or the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 3-6 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 3-6, but also to the various system components as described above with reference to FIGS. 1-2.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

FIG. 1 is a block diagram illustrating an example system 2. It should be appreciated that system 2 is an example system and is not intended to represent the only possible environment in which the techniques of this disclosure are applicable. Rather, the techniques of this disclosure may be applied in many different environments. For instance, the techniques of this disclosure may be applied in systems with more or fewer components than are illustrated in FIG. 1.

In the example of FIG. 1, system 2 comprises a transaction server system 4 operated by a transaction service provider that provides online transaction services. Details of the online transaction services are provided in detail below. In various embodiments, transaction server system 4 may be implemented in a wide variety of ways. For instance, transaction server system 4 may be implemented as a standalone server that executes software that causes the server to provide the online transaction services. In a second example, transaction server system 4 may be implemented as a cluster of computers that collectively provide the online transaction services. A cluster of computers may operate as a single logical server that provides the online transaction services. In various embodiments, transaction server system 4 may be implemented as a personal computer, a supercomputer, a grid computing system, a mainframe computer, one or more server blades, or another type of computing system.

System 2 comprises a host server system 6 that hosts a website 7 that includes at least one web page. Website 7 may be a wide variety of different types of websites. In various embodiments, website 7 may be a social networking website, a blog site, a personal website, or another type of website. Further disclosure of various embodiments of website 7 and the web page are provided in detail below. Host server system 6 may be implemented in a wide variety of ways. For instance, host server system 6 may be implemented in any of the example ways for implementing transaction server system 4 described above.

In addition to transaction server system 4 and host server system 6, system 2 includes a client device 8 and a client device 10 that act as clients of transaction server system 4 and host server system 6. In various embodiments, client device 8 and client device 10 may be implemented in a variety of ways. For example, client device 8 and/or client device 10 may be implemented as a personal computer, a mainframe computer, a television set top box, a mobile telephone, a network telephone, a personal digital assistant, a portable media player, a home media player, a device integrated into a vehicle, a network kiosk, or another type of device. In another example, client device 8 and/or client device 10 may be a logical device that comprises one or more computing devices of the same or different types.

In the example of RIG. 1, a merchant user 12 uses client device 8 and a purchasing user 14 uses client device 10. Merchant user 12 and/or purchasing user 14 may be any entity, A network 16 in system 2 facilitates communication between transaction server system 4, host server system 6, client device 8, and client device 10. Network 16 may include one or more types of network. For instance, network 16 may include a local area network, a wide area network (e.g., the Internet), a global area network, a metropolitan area network, a public switched telephone network, and/or another type of network. Network 16 may include many network devices and many network links. The network devices in network 16 may include bridges, hubs, switches, firewalls, routers, load balancers, and other types of network devices. The network links in network 16 may include wired links.

Merchant user 12 may use client device 8 to register for an online transaction account. To register for the online transaction account, merchant user 12 may launch a web browser application 18 on client device 8. For instance, merchant user 12 may launch a Microsoft Internet Explorer™ web browser application on client device 8. Merchant user 12 may navigate web browser application 18 to a registration web page provided by transaction server system 4. The registration web page may include data entry features that enable merchant user 12 to enter information needed to register for the online transaction account. For instance, the registration web page may include data entry features that enable merchant user 12 to enter an address, a telephone number, bank account information, a personal identification number (PIN), and other registration information. In various embodiments, merchant user 12 enters the information needed to register for the online transaction account and transaction server system 4 uses the information to create an online transaction account for merchant user 12. Purchasing user 14 may use a web browser application 20 operating on client device 10 to register for an online transaction account in a similar fashion.

In various embodiments, merchant user 12 may use client device 8 to transfer money into the online transaction account from a bank account. For instance, if merchant user 12 entered bank account information along with registering for the online transaction account, merchant user 12 may use client device 8 to access a web page hosted by transaction server system 4 to transfer money from the bank account into the online transaction account. In addition, if there is money in the online transaction account, merchant user 12 may use client device 8 to transfer money out of the online transaction account. For instance, merchant user 12 may use client device 8 to interact with a web page hosted by transaction server system 4 to transfer money from the online transaction account to the bank account. In various embodiments, merchant user 12 may use client device 8 to interact with a web page hosted by transaction server system 4 to request a check drawn against the money in the online transaction account. In a similar fashion, purchasing user 14 may use client device 10 to transfer money into or out of the online transaction account of purchasing user 14.

As mentioned briefly above, host server system 6 hosts website 7. In various embodiments such as the example of FIG. 1, merchant user 12 has a right to modify some or all content in website 7. For example, if website 7 is a social networking website, merchant user 12 may have the right to modify a profile page associated with merchant user 12. In this example, merchant user 12 may have the right to post video clips, photographs, expressions of personal interest, expressions of political affiliation, and other information on the profile page.

Transaction server system 4 stores a reference copy of a storefront widget 24. After the merchant user 12 registers for an online transaction account, transaction server system 4 enables merchant user 12 to embed storefront widget 24 in a web page in the website hosted by host server system 6. For example, in various embodiments transaction server system 4 may transmit to client device 8 a link that identifies a resource of website 7 that, in response to being accessed, initiates a process that embeds storefront widget 24 in a web page in the website. In this example, the resource may be a software object that such as a PHP: Hypertext Processor (PHP) script, a common gateway interface (CGI) script, a Java applet, or another type of software object. In various embodiments, the process that embeds storefront widget 24 in the web page may prompt merchant user 12 to provide one or more user identification credentials, such as a username and password, and prompt merchant user 12 to confirm the intent of merchant user 12 to embed storefront widget 24 in the web page. In the example in which website 7 is a social networking website, the resource may embed storefront widget 24 in the profile page associated with merchant user 12.

In various embodiments, merchant user 12 may use web browser application 18 to retrieve the web page in which storefront widget 24 is embedded. Web browser application 18 retrieves the web page and web browser application 18 renders the web page. As part of a process to render the web page, web browser application 18 retrieves a copy of storefront widget 24 from transaction server system 4. In the example of FIG. 1, the retrieved copy of storefront widget 24 is labeled "storefront widget 26." Web browser application 18 displays storefront widget 26 as part of the web page.

Web browser application 18 displays storefront widget 26 as part of the web page and, in various embodiments, merchant user 12 may use storefront widget 26 to input product information. The product information may describe a product that merchant user 12 is offering for sale. For example, the product information may include a picture of an item, a description of the item, a price of the item, links to web pages about the item, and other information about the item. Furthermore, merchant user 12 may input product information that describes multiple products that merchant user 12 is offering for sale.

Storefront widget 26 receives the product information and transmits the product information to transaction server system 4. Transaction server system 4 stores the product information. In various embodiments a web browser application, such as web browser application 18 and/or web browser application 20, retrieves the storefront widget and the web browser application retrieves the product information associated with merchant user 12 in addition to the storefront widget. The web browser renders the web page and the storefront widget displays the product information. For instance, if the product information describes a pair of shoes that merchant user 12 is offering for sale, the storefront widget may display a picture of the shoes, a description of the shoes, a price of the shoes, and other information included in the product information.

In various embodiments such as the one depicted as system 2, if purchasing user 14 has a right to retrieve the web page, purchasing user 14 may use web browser application 20 to retrieve the web page. For example, if the website hosted by host server system 6 is a social networking site, purchasing user 14 may have a right to retrieve the web page if purchasing user 14 is listed as a friend of merchant user 12. Web browser application 20 retrieves the web page and retrieves a copy of storefront widget 22, In the example of FIG. 1, the copy of storefront widget 22 retrieved by web browser application 20 is labeled "storefront widget 26." In various embodiments, web browser application 20 retrieves product information associated with merchant user 12 from transaction server system 4. Web browser application 20 displays storefront widget 26 as part of the web page. Web browser application 20 displays storefront widget 26 and storefront widget 26 displays the product information.

In various embodiments, storefront widget 26 enables purchasing user 14 to purchase a product. For example, storefront widget 26 may display a "Buy Now" icon, purchasing user 14 selects the "Buy Now" icon and storefront widget 26 may prompt purchasing user 14 to enter a user identity credential that identifies purchasing user 14. For instance, storefront widget 26 may prompt purchasing user 14 to enter a username and password, a PIN, an account number, a biometric indicator, or other types of user identity credentials.

In various embodiments, storefront widget 26 receives user identity credential from purchasing user 14 and sends the user identity credential to transaction server system 4. In various embodiments, storefront widget 26 does not require web browser application 20 to navigate away from the web page and/or does not require the opening of an additional window. Transaction server system 4 determines whether the user identity credential is valid. For instance, transaction server system 4 may determine whether a username specified by the user identity credential corresponds to a password specified by the user identity credential. Transaction server system 4 determines that the user identity credential is valid and electronically transfers an appropriate amount of money from the online transaction account of purchasing user 14 (i.e., the purchaser account) to the online transaction account of merchant user 12 (i.e., the merchant account).

In various embodiments, transaction server system 4 notifies merchant user 12 that purchasing user 14 has purchased the product described by the product information. The merchant user 12 may be obligated to send the product to purchasing user 14. In this way, the storefront widget embedded in the web page enables an online transaction between the merchant user 12 and purchasing user 14.

Figure 2:
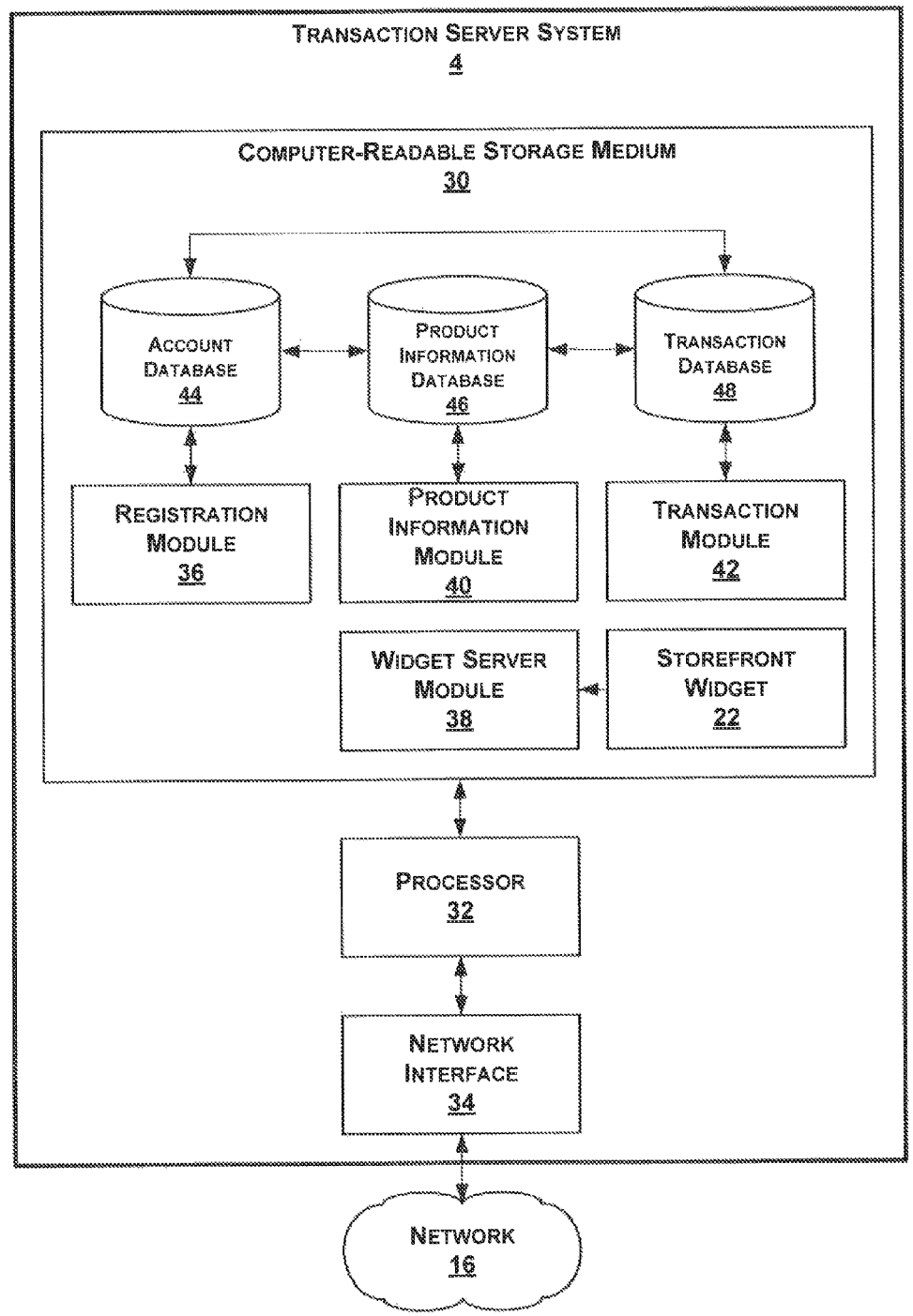
FIG. 2 is a block diagram illustrating example details of a transaction server system in the system of FIG. 1, in accordance with various embodiments.

FIG. 2 is a block diagram illustrating example details of transaction server system 4. As illustrated in the example of FIG. 2, transaction server system 4 comprises a computer-readable storage medium 30. Computer-readable storage medium 30 may include one or more computer-readable storage media on one or more computing devices. Example types of computer-readable storage media include, but are not limited to: Random Access Memory (RAM), Read-Only Memory (ROM), Electrically-Erasable Programmable Read-Only Memory (EEPROM), flash memory, or other memory technology, CD-ROM, digital versatile discs (DVD) or other optical storage, magnetic cassettes, magnetic tape, magnetic disk storage or other magnetic storage devices, or any other types of media which can be used to store the desired information and which can be accessed by transaction server system 4.

Furthermore, as illustrated in the example of FIG. 2, transaction server system 4 comprises a processor 32, Processor 32 may comprise one or more microprocessors or processing cores on one or more computing devices. Processor 32 accesses data and instructions stored in computer-readable storage medium 30. In response to processor 32 accessing instructions stored in computer-readable storage medium 30, processor 32 may execute the instructions.

Transaction server system 4 includes a network interface 34. Network interface 34 enables transaction server system 4 to communicate via network 16. Network interface 34 may comprise one or more physical network interfaces. For instance, network interface 34 may comprise one or more Ethernet cards, fiber optic interface cards, T1 line cards, wireless network interfaces, or other types of physical network interfaces. Processor 32 can send data to network interface 34 for transmission on network 16. Furthermore, network interface 34 can send data from network 16 to processor 32.

In various embodiments, such as the example of FIG. 2, computer-readable storage medium 30 includes a registration module 36, a widget server module 38, a product information module 40, and a transaction module 42. In general, registration module 36 comprises instructions that, when executed by processor 32, enable transaction server system 4 to receive and process requests to register for online transaction accounts. Widget server module 38 comprises instructions that, when executed by processor 32, enable transaction server system 4 to respond to requests from devices on network 16 for storefront widget 22. In other words, transaction server system 4 receives a request for a copy of the storefront widget from a client device that is processing a web page in which storefront widget 22 is embedded and widget server module 38 sends a copy of storefront widget 22 to the client device. Product information module 40 comprises instructions that, when executed by processor 32, enable transaction server system 4 to receive and process requests to store and requests to retrieve product information. Transaction module 42 comprises instructions that, when executed by processor 32, enable transaction server system 4 to receive and process requests to perform transactions between online transaction accounts. Details of the functionality of registration module 36, widget server module 38, product information module 40, and transaction module 42 are explained below with reference to FIGS. 5-7.

In various embodiments, computer-readable storage medium 30 includes an account database 44, a product information database 46, and/or a transaction database 48. In general, account database 44 stores account information, product information database 46 stores product information, and transaction database 48 stores transaction records. Although shown in the example of FIG. 2 as separate databases, account database 44, product information database 46, and/or transaction database 48 may be implemented as a single database.

Figure 3:
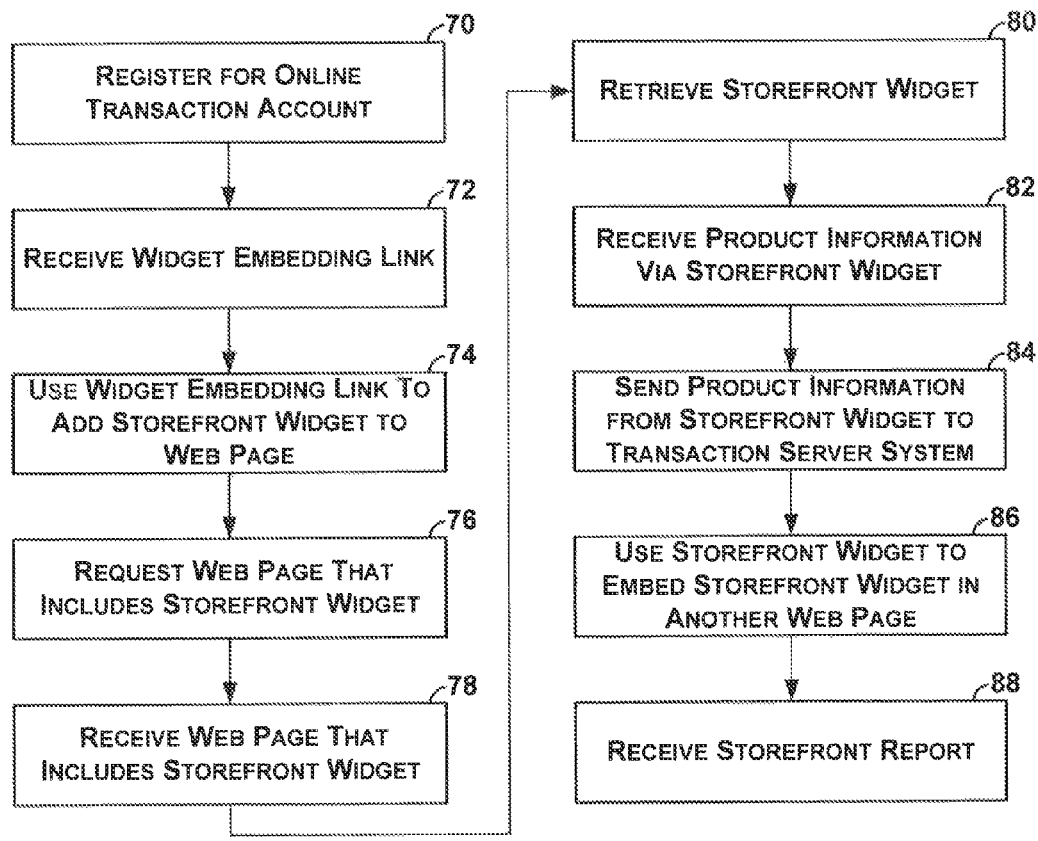
FIG. 3 is a flowchart illustrating an example sequence of steps performed by a client device used by a merchant user, in accordance with various embodiments.

FIG. 3 is a flowchart illustrating an example sequence of steps performed by client device 8. In various embodiments, client device 8 may, in response to a request from merchant user 12, send a registration request to transaction server system 4 for an online transaction account (70). To register for an online transaction account, merchant user 12 may use web browser application 18 in client device 8 to send a request to register for an online transaction account to transaction server system 4.

In various embodiments, merchant user 12 registers for an online transaction account, client device 8 may receive a widget embedding link (72). The widget embedding link may identify a resource of the website hosted by host server system 6 that, in response to accessing, initiates a process that embeds storefront widget 22 in a web page in the website. For example, client device 8 may receive a web page from transaction server system 4 that includes the widget embedding link.

Client device 8 may use the widget embedding link to add storefront widget 22 to a web page in the website hosted by host server system 6 (74). For example, client device 8 may, in response to merchant user 12 selecting the widget embedding link, send a request to host server system 6 to access the resource identified by the widget embedding link, thereby initiating a process that embeds storefront widget 22 in a web page in the website.

In various embodiments, client device 8 may send a request for the web page that includes storefront widget 22 to host server system 6 (76). Client device 8 may then receive the web page from host server system 6 (78). After client device 8 receives the web page, client device 8 may, upon interpreting code in the web page that references the storefront widget, retrieve a copy of storefront widget 22 (i.e., storefront widget 24) from transaction server system 4 (80).

Client device 8 retrieves storefront widget 24 and instructions in storefront widget 24 may enable client device 8 to receive product information from merchant user 12 via storefront widget 24 (82). For example, in various embodiments, instructions in storefront widget 24 may cause client device 8 to present input features (e.g., text boxes, drop-down selection boxes, etc.) within storefront widget 24 on the web page. Instructions in storefront widget 24 may cause client device 8 to send the product information to transaction server system 4 (84). In this way, merchant user 12 can use storefront widget 24 to input product information.

In various embodiments, merchant user 12 may also use storefront widget 24 to embed the storefront widget in a second or different web page (86). For example, storefront widget 24 may include a feature that, in response to selection by merchant user 12, accesses a resource of a second website. The resource is access and embeds a reference to the storefront widget 22 in a web page of the second website.

In various embodiments, client device 8 may receive a storefront report from transaction server system 4 (88). The storefront report may include a variety of information relevant to sales of the products described by the product information. For instance, the storefront report may include notices that various products have been purchased. In other instances, the storefront report may indicate how many people have used the storefront widget.

Figure 4:
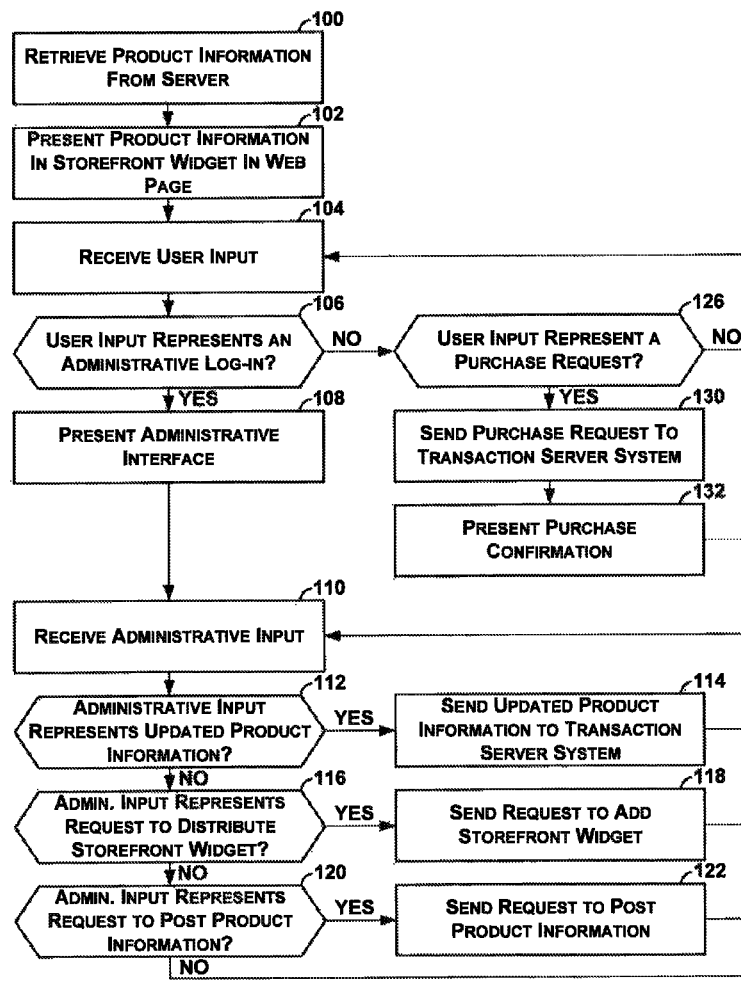
FIG. 4 is a flowchart illustrating an example operation of a storefront widget, in accordance with various embodiments.

FIG. 4 is a flowchart illustrating an example operation of a storefront widget. In response to a copy of storefront widget 22 being loaded on a client device (e.g., storefront widget 24 on client device 8), storefront widget 24 retrieves product information from transaction server system 4 (100). To retrieve the product information, storefront widget 24 may, for instance, interpret a parameter in the web page in which storefront widget 24 is embedded. This parameter may identify the product information that storefront widget 24 is to retrieve from transaction server system 4. In various embodiments, the parameter may identify the product information associated with merchant user 12. In this instance, storefront widget 24 may send this parameter to transaction server system 4 to retrieve the proper product information.

Storefront widget 24 retrieves the product information, storefront widget 24 may present the product information in storefront widget 24 as displayed in the web page (102). For instance, if the product information includes a photograph of a product, storefront widget 24 displays the photograph. In various embodiments, storefront widget 24 may receive user input (104). For instance, a user may click on an area of storefront widget 24. Storefront widget 24 may determine whether the user input represents administrative log-in input (106). For example, administrative log-in input may comprise the selection of an administration tab displayed in storefront widget 24 followed by a valid username and a password.

If the user input represents an administrative log-in ("YES" of 106), storefront widget 24 may present an administrative interface (108). Storefront widget 24 may receive administrative input from a user (e.g., merchant user 12) (110) and may determine whether the administrative input represents updated product information (112). In various embodiments, if the administrative input represents updated product information ("YES" of 112), storefront widget 24 may send the updated product information to transaction server system 4 (114). Storefront widget 24 may loop back and receive additional administrative input (110).

In various embodiments, storefront widget 24 may determine whether the administrative input represents a request to distribute the storefront widget (116). For example, the administrative interface may include a link that identifies a resource of a website that, in response to being accessed, initiates a process that embeds the storefront widget in a web page in the website. The resource may be in a website other than the website that includes the web page in which storefront widget 24 is embedded. For example, if storefront widget 24 is embedded in a profile page of merchant user 12 in a first social networking site, the link may identify a resource of a second social networking site, the resource initiating a process to embed the storefront widget in a profile page of merchant user 12 in the second social networking site. If the administrative input represents a request to distribute the storefront widget ("YES" of 116), storefront widget 24 causes client device 8 to send a request to add the storefront widget to a web page in another website (118). Storefront widget 24 may loop back and receive additional administrative input (110).

If the administrative input does not represent a request to distribute the storefront widget ("NO" of 116), storefront widget 24 may determine whether the administrative input represents a request to post the product information to a website of an online merchant (120), If the administrative input represents a request to post the product information to a website of an online merchant ("YES" of 120), storefront widget 24 causes client device 8 to send a request to the website of the online merchant to post the product information (122). For example, storefront widget 24 may cause client device 8 to reformat the product information such that the product information can be sent to an online retailer, such as the online auction and sales site operated by eBay, Inc. of San Jose, Calif., Storefront widget 24 may then loop back and receive additional administrative input (110).

If the administrative input does not represent a request to post the product information to a website of an online merchant ("NO" of 120), storefront widget 24 may ignore the administrative input and loop back to receive additional administrative input (110). It should be appreciated that some implementations of the storefront widget may accept and process types of administrative input other than those included in the example of FIG. 4.

Storefront widget 24 may determine whether the user input represents a purchase request (126). In various embodiments, the purchase request may specify that a user of the client device (e.g., purchasing user 14) wants to purchase a product described by the product information presented by storefront widget 24. If the user input does not represent a purchase request ("NO" of 126), storefront widget 24 may ignore the user input and loop back to receive additional user input (104). If the user input represents a purchase request ("YES" of 126), storefront widget 24 may send a purchase request to transaction server system 4 (130). Storefront widget 24 may present a purchase confirmation to the user (132).

Figure 5:
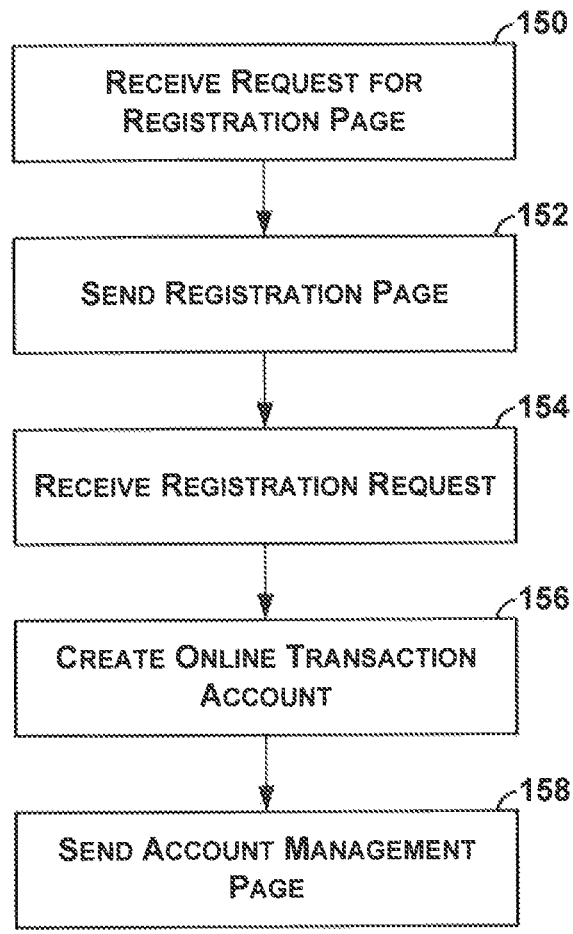
FIG. 5 is a flowchart illustrating an example operation of a registration module in the transaction server system, in accordance with various embodiments.

FIG. 5 is a flowchart illustrating an example operation of registration module 36 in transaction server system 4. Registration module 36 receives a request for a registration web page from a client device (150). For instance, registration module 36 may receive the request for the registration web page from client device 8 or client device 10. In response to the request for the registration web page, registration module 36 sends the registration web page to the client device (152). The registration web page may include input features that enable a user of the client device to input personal information required for an online transaction account.

Registration module 36 receives a registration request from the client device (154). The registration request may include the personal information that the user entered into the input features of the registration web page. In response to registration module 36 receiving the registration request, registration module 36 may create an online transaction account (156). In response to registration module 36 creating the online transaction account, registration module 36 may create a new entry in account database 44 for the online transaction account. The entry in account database 44 may include personal information specified in the registration request.

In various embodiments, registration module 36 may send an account management web page to the client device (158). The account management web page may include a link that identifies a resource of the website hosted by host server system 6 that, in response to being accessed, initiates a process that embeds storefront widget 22 in a web page in website 7.

Figure 6:
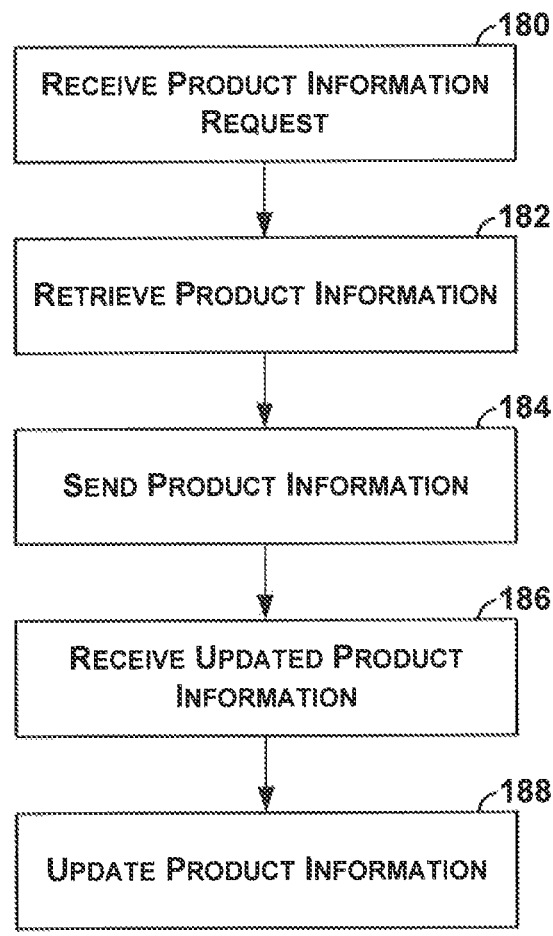
FIG. 6 is a flowchart illustrating an example operation of a product information module in the transaction server system, in accordance with various embodiments.

FIG. 6 is a flowchart illustrating an example operation of product information module 40 in transaction server system 4. As illustrated in the example of FIG. 6, product information module 40 may initially receive a product information request from a client device (180). For instance, product information module 40 may receive a product information request from the client device (e.g., client device 8 or client device 10) in response to the client device interpreting instructions in a copy of the storefront widget upon rendering a web page that includes the storefront widget.

After receiving the product information request, product information module 40 may retrieve product information indicated by the product information request from product information database 46 (182). Product information module 40 may send the retrieved product information to the client device that requested the product information (184).

In various embodiments, product information module 40 may receive updated product information from a client device (186). For instance, product information module 40 may receive updated product information that includes product information associated with a new product that merchant user 12 is offering for sale. In various embodiments, product information module 40 may receive updated product information that updates product information that describes an existing product that merchant user 12 is offering for sale. Product information module 40 may update product information database 46 to include the updated product information.

Figure 7:
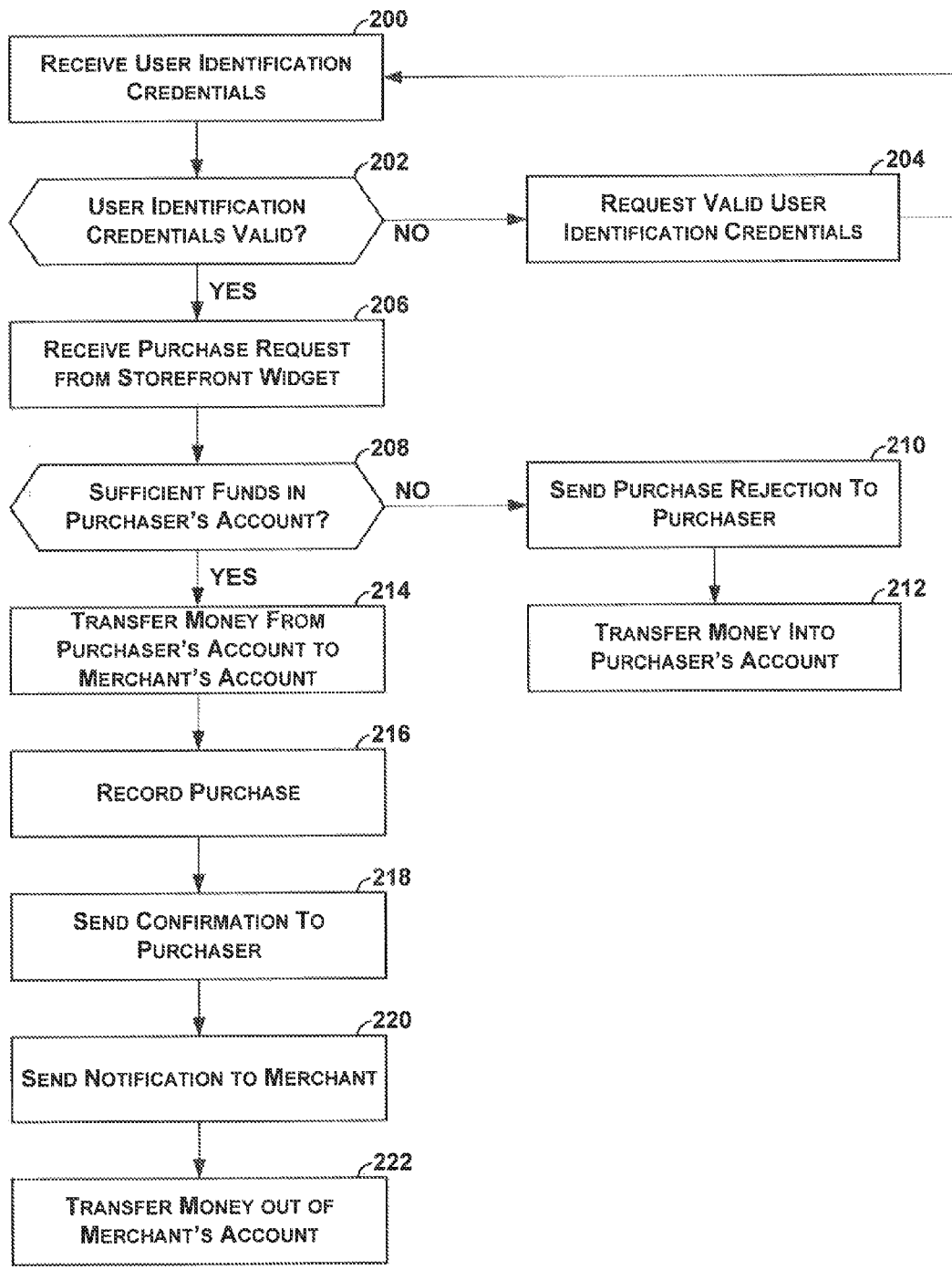
FIG. 7 is a flowchart illustrating an example operation of a transaction module in the transaction server system, in accordance with various embodiments.

FIG. 7 is a flowchart illustrating an example operation of transaction module 42 in the transaction server system 4. Transaction module 42 receives a set of user identification credentials from client device 10 (200). For example, web browser application 20 in client device 10 renders a web page that includes storefront widget 26. In various embodiments, storefront widget 26 may prompt purchasing user 14 to input user identification credentials in response to purchasing user 14 selects a "Buy" link in storefront widget 26. In this example, storefront widget 26 may send the user identification credentials to transaction server system 4.

After receiving the user identification credentials, transaction module 42 determines whether the user identification credentials are valid (202). If the user identification credentials are not valid ("NO" of 202), transaction module 42 may send a request to client device 10 for valid user credentials (204). For instance, upon receiving the request for valid user credentials, storefront widget 26 on client device 10 may prompt purchasing user 14 to re-enter the user identification credentials and transaction module 42 may again receive user identification credentials (200).

If the user identification credentials are valid ("YES" of 202), transaction module 42 may receive a purchase request for a product from storefront widget 26 (206). The purchase request identities the product that purchasing user 14 wishes to purchase. In various embodiments, transaction module 42 may determine whether there are sufficient funds in the online transaction account of purchasing user 14 to cover the price of the product that purchasing user 14 wants to purchase (208). For instance, transaction module 42 may access account database 44 to determine the amount of money in the online transaction account of purchasing user 14 and may determine whether the amount of money in the online transaction account of purchasing user 14 is greater than the price of the product that purchasing user 14 wants to purchase.

If there are not sufficient funds in the online transaction account of purchasing user 14 to cover the price of the product that purchasing user 14 wants to purchase ("NO" of 208), transaction module 42 may, in various embodiments, send a purchase rejection to purchasing user 14 (210). For example, transaction module 42 may send a rejection message to client device 10. Storefront widget displays a message that indicates that there are not sufficient funds in the online transaction account of purchasing user 14 to cover the price of the product that purchasing user 14 wants to purchase. In various embodiments, transaction module 42 may transfer money into the online transaction account of purchasing user 14 from the bank account of purchasing user 14 (212).

If there are sufficient funds in the online transaction account of purchasing user 14 to cover the price of the product that purchasing user 14 wants to purchase ("YES" of 208), in various embodiments transaction module 42 electronically transfers money from the online transaction account of purchasing user 14 to the online transaction account of merchant user 12 (214). Transaction module 42 may record the purchase in transaction database 48 (216) and may send a purchase confirmation to purchaser (218). For example, transaction module 42 may send a message to client device 10. In this example, client device 10 receives the message and storefront widget 26 in client device 10 displays a message that confirms the purchase.

In various embodiments, transaction module 42 may send a purchase notification to merchant user 12 (220). For example, transaction module 42 may send an email message to merchant user 12 notifying merchant user 12 that purchasing user 14 has purchased a product through the storefront widget and that merchant user 12 is now obligated to send the purchased product to purchasing user 14. Subsequently, transaction module 42 may transfer the money into the bank account of merchant user 12 from the online transaction account of merchant user 12 (222).

Storefront widget embedded in a web page presented by a web browser Application. A web page may, for example, be presented by web browser application 18 in client device or web browser application 20 in client device 10. Storefront widget displays an image of a product. In addition, the storefront widget may display an "administration" tab that, in response to being selected, causes the storefront widget to display an administrative interface. An administrative interface of a storefront widget embedded in a web page may be presented by a web browser application, in various embodiments, the administrative interface includes a feature that, from the user's perspective, allows the user to add the storefront widget to a web page of a different website. This feature may be implemented as a link that refers to a resource of a website that does not include the web page. This resource, in response to being accessed, initiates a process that embeds the storefront widget in a web page in the website that does not include the web page.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL, by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner in response to being provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like, Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gainal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (US), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perk PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stookquotes/ge) and an IP address (123.56.789.234). The web server retrieves the appropriate web pages and sends the data or applications for the web pages to the IP address. Web services are applications that are capable of interacting with other applications over a communications means, such as the internee. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein, WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps, it should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references; (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to at least one of A, B, and C' or at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary Rif a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for," As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

It is to be understood that the implementations described herein may be implemented by hardware, software, firmware, middleware, microcode, or any combination thereof. When the systems and/or methods are implemented in software, firmware, middleware or microcode, program code or code segments, they may be stored in a computer-readable storage medium, such as a storage component. A code segment may represent a procedure, a function, a subprogram, a program, a routine, a subroutine, a module, a software package, a class, or any combination of instructions, data structures, or program statements A code segment may be coupled to another code segment or a hardware circuit by passing and/or receiving information, data, arguments, parameters, or memory contents, Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes and instructions may be stored in computer-readable storage Media and executed by processors. The memory unit may be implemented within the processor or external to the processor, in which case it can be communicatively coupled to the processor via various means as is known in the art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-based method comprising:
   receiving, by a widget administration computer, a request for an instance of a storefront widget from a client device that is processing a first web page in which the storefront widget is embedded, the first web page belonging to a first website,
   determining, by the widget administration computer, that the request for an instance of a storefront widget represents a request to distribute the storefront widget;
   receiving, by the widget administration computer, confirmation from a merchant user to embed the storefront widget in a second web page;
   wherein the first web page is a first profile page of a first social networking site,
   wherein the storefront widget is configured to enable a purchase of a product;
   sending, by the widget administration computer, product information to the client device, wherein the product information is associated with a merchant account, the product information describing the product; and
   in response to the receiving confirmation from the merchant user to embed the storefront widget in the second web page, sending, by the widget administration computer and based on administrative input from the merchant user associated with the merchant account, the instance of the storefront widget to the client device, the instance of the storefront widget configured to present the product information and to present a link that identifies a resource of a second web page, wherein the resource is at least one of a Hypertext Preprocessor (PHP) script, a common gateway interface (CGI) script, a Java applet, or a software object;

wherein the resource, in response to being accessed by the client device and in response to the determining, initiates a process that embeds the instance of the storefront widget in the second web page, wherein the second web page is associated with a second social networking site.

2. The method of claim 1, further comprising:
maintaining, by the widget administration computer, an account database that stores data representing the merchant account and a purchaser account;
receiving, by the widget administration computer, a purchase request for the product from the instance of the storefront widget on the client device; and
in response to the receiving the purchase request, transferring, by the computer, money from the purchaser account to the merchant account.

3. The method of claim 2, further comprising:
prior to the transferring the money from the purchaser account to the merchant account, transferring, by the widget administration computer, the money from a bank account of the purchaser into the purchaser account; and
in response to the transferring the money to the merchant account, transferring, by the computer, at least a portion of the money from the merchant account to a bank account of the merchant.

4. The method of claim 2, further comprising, by the widget administration computer and in response to the transferring the money, sending purchase confirmation information to the client device, wherein sending the storefront widget comprises sending instructions that, in response to being processed by the client device, cause the storefront widget to present the purchase confirmation information in response to the client device receiving the purchase confirmation information.

5. The method of claim 2, further comprising, by the widget administration computer, determining whether a user identification credential is valid, wherein the sending the instance of the storefront widget comprises sending instructions that, in response to being processed by the client device, cause the storefront widget to receive the user identification credential from a user and wherein the transferring the money from the purchaser account to the merchant account comprises the transferring the money from the purchaser account to the merchant account in response to determining that the user identification credential is valid.

6. The method of claim 1, further comprising, by the widget administration computer, transmitting to a second client device, a link that identifies a resource of the first website, wherein the resource, in response to being accessed, initiates a process that embeds the storefront widget in the first web page, wherein the client device is a first client device.

7. The method of claim 1, further comprising:
receiving, by the widget administration computer, a request for a second instance of a storefront widget from a second client device that is processing the first web page;
sending, by the widget administration computer, the second instance of the storefront widget to a second client device; and
receiving, by the widget administration computer, the product information from the second instance of the storefront widget, wherein the client device is a first client device and the instance of the storefront widget is a first instance of the storefront widget, and wherein the storing the product information comprises storing the product information in response to receiving the product information from the second instance of the storefront widget.

8. The method of claim 1, further comprising, by the widget administration computer and in response to transferring money, sending a notification to a user associated with the merchant account.

9. The method of claim 1, wherein the sending the instance of the storefront widget comprises sending instructions that, in response to being processed by the client device, post the product information to an online merchant in response to user input received by the storefront widget.

10. A server system comprising:
a widget administration processor,
a tangible, non-transitory memory configured to communicate with the widget administration processor, the memory having instructions stored thereon that, in response to execution by the widget administration processor, cause the widget administration processor to perform operations comprising:
receiving, by the widget administration processor, a request for an instance of a storefront widget from a client device that is processing a first web page in which the storefront widget is embedded,
determining, by the widget administration processor, that the request for an instance of a storefront widget represents a request to distribute the storefront widget;
receiving, by the widget administration processor, confirmation from a merchant user to embed the storefront widget in a second web page;
wherein the first web page is a first profile page of a social networking site,
wherein the storefront widget is configured to enable a purchase of a product;
in response to the receiving confirmation from the merchant user to embed the storefront widget in the second web page, sending, by the widget administration processor and based on administrative input from the merchant user associated with the merchant account, the instance of the storefront widget to the client device;
sending, by the widget administration processor, product information to the client device,
wherein the instance of the storefront widget on the client device is configured to present the product information, and
wherein product information is associated with the merchant account, and wherein the product information is associated with a product;
receiving, by the widget administration processor, a purchase request from the instance of the storefront widget; and,
in response to the purchase request, transferring, by the widget administration processor, money to a merchant account from a purchaser account.

11. The server system of claim 10, further comprising transmitting to a second client device a link that identifies a resource of a website that includes the second web page, wherein the resource is at least one of a Hypertext Preprocessor (PHP) script, a common gateway interface (CGI) script, a Java applet, or a software object, wherein in response to being accessed by the client device, the resource initiates a process that embeds the storefront widget in the second web page.

12. The server system of claim 11, wherein the storefront widget comprises instructions that, in response to being processed by the client device and in response to the determining, cause the client device to present within the storefront widget a link to a resource of a website, wherein in response to being accessed the resource initiates a process that embeds the storefront widget in the second web page in the website.

13. The server system of claim 11, wherein the storefront widget comprises instructions that, in response to being processed by the client device, enable the client device to receive the product information from a user through the storefront widget and to send the product information to the server system.

14. The server system of claim 11, wherein the storefront widget comprises instructions that, in response to being processed by the client device, cause the client device to send a request for the product information to the server system.

15. The server system of claim 11, wherein the storefront widget comprises instructions that, in response to being processed by the client device, cause the client device post the product information to an online merchant.

16. An article of manufacture including a non-transitory, tangible computer readable storage medium having instructions stored thereon that, in response to execution by a widget administration computer, cause the computer-based system to perform operations comprising:

receiving, by the widget administration computer, a request for an instance of a storefront widget from a client device that is processing a first web page in which the storefront widget is embedded;

determining, by the widget administration computer, that the request for an instance of a storefront widget represents a request to distribute the storefront widget;

receiving, by the widget administration computer, confirmation from a merchant user to embed the storefront widget in a second web page;

wherein the first web page is a first profile page of a social networking site, wherein the storefront widget is configured to enable a purchase of a product;

sending, by the widget administration computer, product information to the client device, wherein the product information is associated with a merchant account, and wherein the product information describes a product;

in response to the receiving confirmation from the merchant user to embed the storefront widget in the second web page, sending, by the widget administration computer and based on administrative input from the merchant user associated with the merchant account, the instance of the storefront widget to the client device, the instance of the storefront widget configured to present the product information;

receiving, by the widget administration computer, a purchase request for the product from the instance of the storefront widget on the client device; and in response to the purchase request, transferring, by the widget administration computer, money from a purchaser account to a merchant account.

17. The computer-readable storage medium of claim 16, further comprising transmitting, to a second client device, a link that identifies a resource of a website that includes the second web page, wherein the resource, in response to being accessed and in response to the determining, initiates a process that embeds the storefront widget in the second web page, wherein the client device is a first client device.

18. A computer-based method comprising:

sending, by a widget administration computer and to a client device, product information that describes a product, wherein a request for an instance of a storefront widget is determined to represent represents a request to distribute the storefront widget;

wherein confirmation is received from a merchant user to embed the storefront widget in a second web page;

in response to the receiving confirmation from the merchant user to embed the storefront widget in the second web page, sending, by the widget administration computer and to the client device and based on administrative input from the merchant user associated with the merchant account, a storefront widget that comprises instructions that, in response to being performed by the client device, cause the client device to:

display the product information in a first web page in which the storefront widget is embedded, the first web page belonging to a first website, wherein the first web page is a first profile page of a first social networking site; and present an administrative interface that includes a feature that enables a user of the client device to embed the storefront widget in a second web page of a second social networking site based on the determining.

* * * * *